United States Patent
Zhan et al.

(10) Patent No.: US 9,971,080 B2
(45) Date of Patent: May 15, 2018

(54) BACKLIGHT MODULE AND DISPLAY DEVICE

(71) Applicants: BOE TECHNOLOGY GROUP CO., LTD., Beijing (CN); HEFEI BOE OPTOELECTRONICS TECHNOLOGY CO., LTD., Hefei, Anhui (CN)

(72) Inventors: Jianghui Zhan, Beijing (CN); Ming Fang, Beijing (CN); Chang Lv, Beijing (CN); Hongchao He, Beijing (CN); Jinmoo Park, Beijing (CN); Dong Chen, Beijing (CN)

(73) Assignees: BOE Technology Group Co., Ltd., Beijing (CN); Hefei BOE Optoelectronics Technology Co., Ltd., Beijing (CN)

( * ) Notice: Subject to any disclaimer, the term of this patent is extended or adjusted under 35 U.S.C. 154(b) by 0 days. days.

(21) Appl. No.: 14/744,302

(22) Filed: Jun. 19, 2015

(65) Prior Publication Data

US 2016/0252670 A1 Sep. 1, 2016

(30) Foreign Application Priority Data

Feb. 28, 2015 (CN) .......................... 2015 1 0092056

(51) Int. Cl.
*F21V 8/00* (2006.01)

(52) U.S. Cl.
CPC .......... *G02B 6/0031* (2013.01); *G02B 6/0023* (2013.01)

(58) Field of Classification Search
CPC ... F21V 3/049; F21V 9/16; F21K 9/62; F21K 9/64; B29C 59/16
See application file for complete search history.

(56) References Cited

U.S. PATENT DOCUMENTS

| 6,784,603 B2 * | 8/2004 | Pelka | B82Y 10/00 313/110 |
| 8,622,600 B2 * | 1/2014 | Cheng | G02B 6/0023 362/608 |

(Continued)

FOREIGN PATENT DOCUMENTS

| CN | 102297369 A | 12/2011 |
| CN | 102628580 A | 8/2012 |

(Continued)

OTHER PUBLICATIONS

Chinese Office Action in Chinese Application No. 201510092056.9 dated May 27, 2016 with English translation.

(Continued)

*Primary Examiner* — Anabel Ton
(74) *Attorney, Agent, or Firm* — Collard & Roe, P.C.

(57) ABSTRACT

Disclosed is a backlight module, which includes: a light guide plate having a light incident surface; a light source disposed as facing to the light incident surface and configured for emitting a first wave-band light. The backlight module further includes: a quantum film disposed between the light source and the light guide plate. The quantum film is configured for being excited by the first wave-band light emitted from the light source and emitting a second wave-band light. By disposing the quantum film in the backlight module, the color gamut of LCD is improved.

5 Claims, 2 Drawing Sheets

(56) References Cited

U.S. PATENT DOCUMENTS

| | | | | |
|---|---|---|---|---|
| 9,341,763 | B1* | 5/2016 | Fan | G02B 6/0026 |
| 2007/0274096 | A1* | 11/2007 | Chew | F21V 31/04 |
| | | | | 362/609 |
| 2010/0220261 | A1* | 9/2010 | Mizushima | G02B 6/0035 |
| | | | | 349/64 |
| 2013/0271700 | A1* | 10/2013 | Nakamura | G02B 6/0026 |
| | | | | 349/65 |
| 2014/0036532 | A1* | 2/2014 | Lee | G02B 6/0021 |
| | | | | 362/608 |
| 2014/0063847 | A1* | 3/2014 | Sakamoto | G02B 6/0031 |
| | | | | 362/609 |
| 2016/0091657 | A1 | 3/2016 | Yang et al. | |

FOREIGN PATENT DOCUMENTS

| | | |
|---|---|---|
| CN | 102759050 A | 10/2012 |
| CN | 202972941 U | 6/2013 |
| CN | 203442699 U | 2/2014 |
| CN | 203519974 U | 4/2014 |
| KR | 10-2011-0012246 A | 2/2011 |

OTHER PUBLICATIONS

Second Chinese Office Action in Chinese Application No. 201510092056.9 dated Dec. 5, 2016 with English translation.
Third Chinese Office Action in Chinese Application No. 201510092056.9 dated Apr. 17, 2017 with English translation.

* cited by examiner

BACKLIGHT MODULE AND DISPLAY DEVICE

CROSS REFERENCE TO RELATED APPLICATIONS

This application claims priority under 35 U.S.C. § 119 of Chinese Application No. 201510092056.9 filed on Feb. 28, 2015, the disclosure of which is incorporated by reference.

TECHNICAL FIELD

Embodiments of the present invention relate to a backlight module and a display device comprising the same.

BACKGROUND

In product design process, usually the color gamut of the display device can not satisfy customs demands. At this time, manufacturers often change LED type, adjust color film thickness, and change color film type in order to satisfy customs. However these methods are very time-consuming, and the price of LED with high color gamut is higher, it is not conducive to marketing products rapidly and efficiently.

SUMMARY

Embodiments of the present invention relate to a backlight module and a display device, which improve the color gamut of products effectively.

In first respect, there is provided a backlight module, which comprises: a light guide plate having a light incident surface; a light source disposed as facing to the light incident surface and configured for emitting a first wave-band light. The backlight module further comprises: a quantum film disposed between the light source and the light guide plate, wherein the quantum film is configured for being excited by the first wave-band light emitted from the light source and emitting a second wave-band light.

As an example, the first wave-band light is monochromatic light.

As an example, a wavelength of the second wave-band light is longer than a wavelength of the first wave-band light.

As an example, the first wave-band light is blue light, the second wave-band light comprises red light and green light.

As an example, the first wave-band light is polychromatic light.

As an example, the polychromatic light is white light comprising blue, red and green light, and the quantum film is excited by the blue light and emits secondary red light and secondary green light, the secondary red light and the secondary green light are respectively superposed with the red and green light to form the second wave-band light.

As an example, the quantum film is fixed on the light incident surface of the light guide plate by an optical adhesive.

As an example, the light guide plate comprises a light emitting surface, an optical brightness enhancement film is disposed on the light emitting surface.

As an example, the backlight module further comprises a reflector and a backplate, wherein the reflector is fixed on the backplate and disposed around a perimeter of the light guide plate and the light source.

In second respect, there is further provided a display device, which comprises the above backlight module.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

FIG. 1 schematically illustrates a backlight module according to an embodiment of the present invention;

FIG. 2 schematically illustrates the comparison between a spectrum of the backlight module disposed with a quantum film according to an embodiment of the present invention and a spectrum of the backlight module without the quantum film;

FIG. 3 illustrates a light transmission spectrum of a liquid crystal screen.

DETAILED DESCRIPTION

In order to make objects, technical details and advantages of the embodiments of the invention apparent, the technical solutions of the embodiments will be described in a clearly and fully understandable way in connection with the drawings related to the embodiments of the invention. Apparently, the described embodiments are just a part but not all of the embodiments of the invention. Based on the described embodiments herein, those skilled in the art can obtain other embodiments, without any inventive work, which should be within the scope of the invention.

As illustrated in FIG. 1, an embodiment of the present invention provides a backlight module, which comprises:

a light guide plate 1, having a light incident surface;

a light source 2, which is disposed as facing to the light incident surface and configured to emit a first wave-band light.

Herein, a quantum film 3 is disposed between the light source 2 and the light guide plate 1, and the quantum film 3 is configured to be excited by the first wave-band light and emit a second wave-band light.

As an example, the light emitted from the light source 2 is monochromatic light, such as a first light beam with a first wavelength. Based on quantum dots effect, the quantum film 3 excited by the first light beam can emit a second light beam, the wavelength of which is longer than that of the first light beam, thus, the color gamut of a light crystal device (LCD) is increased.

For example, the light source 2 is a LED light bar which emits blue light. After excited by the blue light emitted from the LED light bar, the quantum film 3 emits the red light and green light.

As an example, the light emitted from the light source 2 is polychromatic light, such as a first polychromatic light including the first light beam. The quantum film 3 emits the second light beam after the film 3 is excited by the first light beam, and then the second light beam is recombined with other light beams included in the first polychromatic light except the first light beam, as a result, a second polychromatic light is formed. In this way, the original light composition ratio of the first polychromatic light is changed.

For example, the first polychromatic light is white light which typically includes red, green and blue light. The blue light having a first wavelength excites red and green quantum dots of the quantum film 3, and then the secondary red light and secondary green light are emitted by the red and green quantum dots. The secondary red light and secondary green light are respectively superposed with the red and green light of the first polychromatic light. In this way, the red, green and blue light composition ratio of the first polychromatic light is changed. As a result, the white light (the second polychromatic light) with different white chromaticity coordinate is formed. For example, the white light with large chromaticity coordinates tends to be yellow (warm color), whereas the white light with small chromaticity coordinates tends to be blue (cool color).

Under the excitation of the blue light, the secondary red light and secondary green light emitted from the quantum film 3 are respectively superposed with the red and green light of the first polychromatic light, as a result, the wave peaks of the red and green light of the second polychromatic light are changed, i.e., the proportion of red and green light is increased, accordingly, the color gamut is increased. This principle is similar to LED spectrum having the RG (red and green) phosphors (LED with high color gamut).

In embodiments of the present invention, the quantum film 3 is, for example, 3M™ QDEF quantum film.

Figure 2:
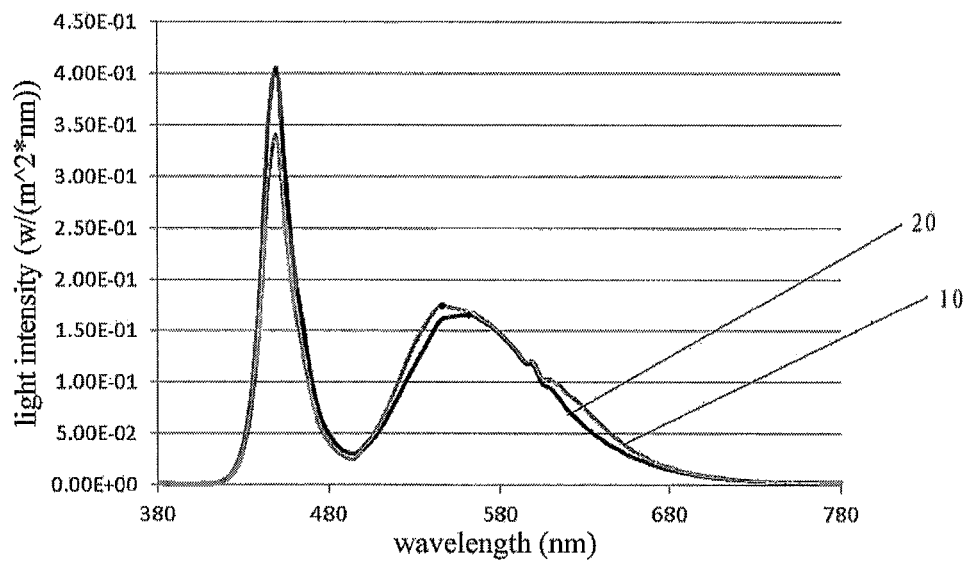

As illustrated in FIG. 2, the first spectrum 10 is the spectrum of the light emitted from the backlight module disposed with QDEF quantum film and using white LED as light source, the second spectrum 20 is the spectrum of the light emitted from the backlight module without QDEF quantum film and using white LED as light source. It can be seen from FIG. 2 that the wave peak of the first spectrum 10 moves to the short-wave direction relative to the second spectrum 20 and the distance between the wave peaks of the first spectrum 10 and the second spectrum 20 is increased. As a result, the color gamut of LCD module is increased. As illustrated in FIG. 2, the black spot in the first spectrum 10 indicates that the peak value of the first spectrum 10 is 545 nm, the black spot in the second spectrum 20 indicates that the peak value of the second spectrum 20 is 560 nm, the peak value of the first spectrum is decreased relative to that of the second spectrum.

Figure 3:
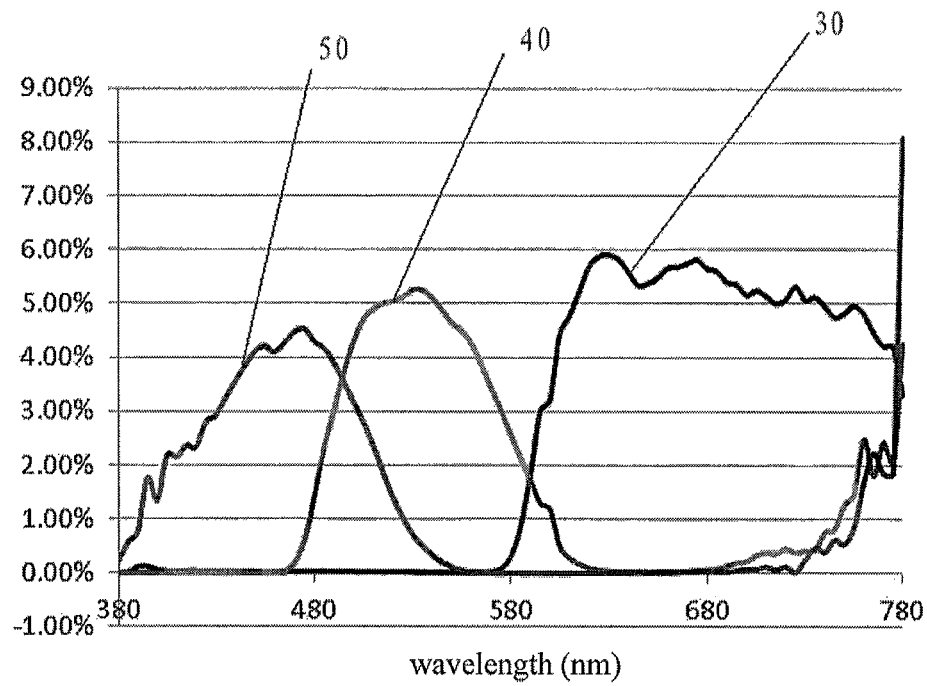

FIG. 3 illustrates a light transmission spectrum of a liquid crystal screen (the third spectrum 30 is red light spectrum, the fourth spectrum 40 is green light spectrum, the sixth spectrum 50 is blue light spectrum). It is assumed that the color gamut which customs demand is 75%, it is proved by experiment that, when the light emitted from the backlight module disposed without quantum film passes through the liquid crystal screen having a light transmission spectrum of FIG. 3, the color gamut is 73.32%, so it can not satisfy customs demands. However, when the light emitted from the backlight module disposed with quantum film passes through the same liquid crystal screen, the color gamut is 75.75%, so it can satisfy customs demands. The color gamut of LCD module can be increased to different levels by adjusting the concentration and proportion of red and green quantum dots in the quantum film.

Figure 1:
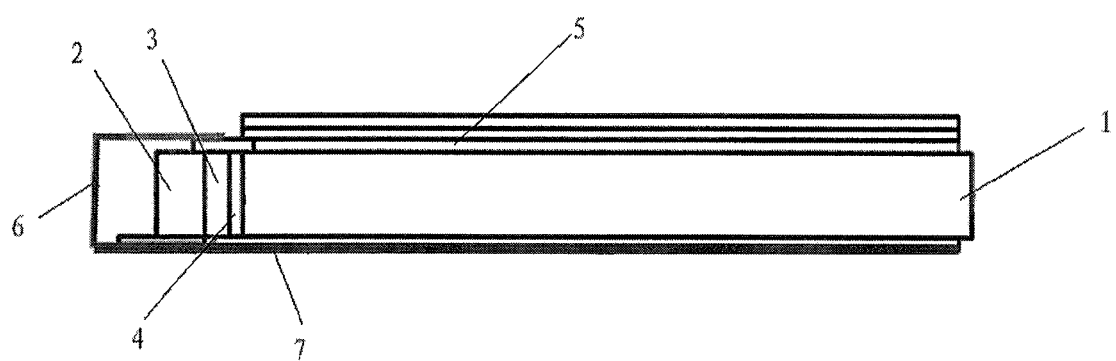

As an example, as illustrated in FIG. 1, the quantum film 3 is fixed on the light incident surface of the light guide plate 1 by an optical adhesive 4.

As an example, an optical brightness enhancement film 5 is disposed on the light emitting surface of the light guide plate 1, in order to improve the brightness of the light emitted from the backlight module.

As an example, the backlight module further comprises a reflector 6 and a backplate 7. The reflector 6 can effectively utilize the light emitted from the light source 2, and the reflector 6 is disposed around the perimeter of the light guide plate 1 and the light source 2, and fixed on the backplate 7. As illustrated in FIG. 1, the reflector 6 is only disposed around the perimeter of the light source 2, but it can be appreciated that, the reflector 6 also can be disposed around the perimeter of the light guide plate 1 in order to increase the light utilization.

An embodiment of the present invention further provides a display device, which comprises the above backlight module.

What is described above is related to the illustrative embodiments of the disclosure only and not limitative to the scope of the disclosure; the scopes of the disclosure are defined by the accompanying claims.

The present application claims the priority of Chinese patent application No. 201510092056.9 filed on Feb. 28, 2015, the disclosure of which is incorporated herein by reference in its entirety.

The invention claimed is:
1. A backlight module, comprising:
a light guide plate, having a light incident surface;
a light source, disposed as facing to the light incident surface and configured for emitting a first white light, wherein the first white light comprises blue light, red light and green light;
a quantum film, disposed between the light source and the light guide plate, wherein the quantum film is configured for being excited by the blue light of the first white light and emitting secondary red light and secondary green light, wherein the secondary red light and the secondary green light are respectively superposed with the red light and the green light of the first white light to form a second white light;
wherein a proportion of red and green light in the second white light is larger than a proportion of red and green light in the first white light;
wherein a concentration proportion between red and green quantum dots in the quantum film is adjustable according to color gamut of light emitted by the backlight module.

2. The backlight module according to claim 1, wherein the quantum film is fixed on the light incident surface of the light guide plate by an optical adhesive.

3. The backlight module according to claim 1, wherein the light guide plate comprises a light emitting surface, an optical brightness enhancement film is disposed on the light emitting surface.

4. The backlight module according to claim 1, further comprising: a reflector and a backplate, wherein the reflector is fixed on the backplate and disposed around a perimeter of the light guide plate and the light source.

5. A display device, comprising the backlight module according to claim 1.

* * * * *